(12) United States Patent
Hanna et al.

(10) Patent No.: US 6,269,118 B1
(45) Date of Patent: Jul. 31, 2001

(54) SIGNAL CARRIER RECOVERY PROCESS

(75) Inventors: Charaf Hanna, Domene; Patrick Lopez, Livré s/Changeon; Sylvain Chevreau, Rennes, all of (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/453,682

(22) Filed: Dec. 3, 1999

(30) Foreign Application Priority Data

Dec. 4, 1998 (EP) ..................................... 9815362

(51) Int. Cl.$^7$ ............................. H03H 7/30; H03H 7/40; H03K 5/159

(52) U.S. Cl. ............................................ 375/233; 375/326

(58) Field of Search .................................. 375/232, 233, 375/326, 344, 371

(56) References Cited

U.S. PATENT DOCUMENTS

| | | | |
|---|---|---|---|
| 3,974,449 | * 8/1976 | Falconer | 375/233 |
| 5,311,546 | * 5/1994 | Paik et al. | 375/232 |
| 5,502,506 | * 3/1996 | Choi | 348/607 |
| 5,872,815 | * 2/1999 | Strolle et al. | 375/321 |

* cited by examiner

*Primary Examiner*—Chi Pham
*Assistant Examiner*—Phuong Phu
(74) *Attorney, Agent, or Firm*—Joseph S. Tripoli; Joseph S. Laks; Ronald H. Kurdyla

(57) ABSTRACT

A carrier recovery process for a received signal comprises estimating the signal carrier frequency, and estimating the signal phase after frequency estimating. During frequency estimating, signal equalizing is performed, during which an equalizer comprising a direct adaptive filter and a recursive adaptive filter adapts only the coefficients of the recursive adaptive filter. During phase estimating, the equalizer adapts only the coefficients of the recursive adaptive filter for a predetermined time.

9 Claims, 1 Drawing Sheet

SIGNAL CARRIER RECOVERY PROCESS

FIELD OF THE INVENTION

The invention relates to a signal carrier recovery process.

The invention applies more particularly to the case where the signal whose carrier is recovered is transmitted in a medium disturbed by echoes of large amplitude.

The invention also finds an advantageous application in the context of on-carrier digital quadrature transmission using a large number of states forming a constellation.

BACKGROUND OF THE INVENTION

Generally, with the aim of transmitting digital data through a transmission channel, these data are modulated using for example a modulation of the pulse amplitude type ("Pulse Amplitude Modulation" or "PAM"). Quadrature amplitude modulations or QAM are used to increase the sum of the data which can be transmitted within a bandwidth of an available channel. QAM modulation is a form of PAM modulation in which a plurality of information bits are transmitted together in an arrangement subsequently referred to as a constellation.

With a view to synchronizing with the signal received, the digital receiver must be provided with a device for generating a reference signal in phase with the signal received. Having been synchronized, the demodulator allows the demodulation of signals containing information in their phase. For example, in QAM modulation, the modulation of "0" and "1" bits corresponds to phases, in the modulated signal, which are determined according to rules which are known per se. Thus, the demodulator must generate a reference signal which must be synchronized in phase with the data carrier. This process is known by the name of carrier phase recovery.

In PAM modulation, each signal is a pulse whose amplitude level is determined by a transmitted symbol. In QAM modulation, for example in 16-QAM modulation, the amplitudes of the symbols −3, −1, 1 and 3 in each quadrature channel are used. It happens that the effect of each symbol transmitted through a channel extends beyond the time interval used to represent this symbol. The distortion caused by the resulting overspill of the symbols received is termed intersymbol interference (or ISI). This distortion has been one of the principal obstacles for data transmissions at high bit rate on limited bandwidth noisy channels. A device known as an "equalizer" is then used to remedy this intersymbol interference problem.

With the aim of reducing the intersymbol interference introduced by the transmission channel, accurate equalization is required. Since the characteristics of the channel are not known in advance, a statistical equalizer is thus used which carries out a mean compensation of the domain of the channels required in terms of amplitude and delay characteristics. The mean square error stochastic gradient algorithm, also known as the LMS algorithm (standing for Least Mean Squares) is generally used as adaptive equalization algorithm.

Thus, one of the essential functions of the receiver in digital transmission systems is therefore the extraction of a carrier synchronized in phase and in frequency with the carrier at the transmission end. A poor phase or a poor frequency at demodulation level reduces the power of the useful signal and creates interference between the quadrature components I and Q of the demodulated QAM signal, thus explaining the importance of the recovered phase.

Another essential function is also, as seen above, the elimination of the distortions of the signal received. Moreover, the response of the channel generally being unknown and, furthermore, susceptible of variation over time, its equalization then requires an adaptive equalizer capable of adapting itself to the channel and of tracking its temporal variations.

Now, in conventional receivers, the adaptive equalizer and the carrier recovery device, comprising a frequency estimator and a phase estimator which are switched as a function of particular criteria, follow one another in the reception chain. In this context, it is not possible to effect carrier recovery in the presence of echoes of large amplitude or of too considerable a phase shift.

SUMMARY OF THE INVENTION

The aim of the present invention is to recover considerable discrepancies in carrier frequency and, simultaneously to compensate for the large amplitude echoes.

To this end, the subject of the invention is a carrier recovery process for a received signal comprising a step of estimating the carrier frequency of this signal and a step of estimating the phase associated with this signal subsequent to the frequency estimation step, characterized in that the following steps are carried out:

during the frequency estimation step, a signal equalization step is implemented during which an equalizer comprising a direct adaptive filter and a recursive adaptive filter adapts only the coefficients of the recursive adaptive filter, during the phase estimation step, the equalizer continues adapting for a predetermined time only the coefficients of the recursive adaptive filter.

Thus, the invention makes it possible to effect carrier recovery in the presence of echoes of large amplitude or of too considerable a frequency phase shift. The adaptation, firstly, of the coefficients of the recursive filter makes it possible to correct long echoes first before refining the equalization. Advantageously, the invention makes it possible to compensate for the powerful echoes in respect of constellations of high order, such as, for example, the constellation implementing 256-state quadrature amplitude modulation.

According to one embodiment, following the equalization by the equalizer of the coefficients of the recursive adaptive filter, a signal equalization step is implemented during which the said equalizer adapts the coefficients of the direct adaptive filter and also the coefficients of the recursive adaptive filter.

According to one embodiment, the frequency estimation step is triggered when the points received by the frequency estimator are superimposed on the patterns of the constellation representing the modulation scheme used, the 90° phase ambiguity being easily resolved in practice by differential coding, and when the points received are akin to predetermined ideal points of the constellation, these received points being situated in an acquisition zone characterized by a considerable distance to the origin and traversed by a diagonal connecting the origin of the constellation to the said point which the zone surrounds.

According to one embodiment, the frequency estimation is carried out by a measurement of phase difference corresponding to the angular distance between the point representing the signal received in the said constellation and the said diagonal.

According to one embodiment, during the frequency estimation step, an updating of an accumulator delivering the carrier frequency error to a demodulator is carried out following the measurement of the phase difference for N consecutive points received and the said ideal points corresponding thereto, N being an integer.

According to one embodiment, the equalization step during the frequency estimation step and/or the signal equalization step during the phase estimation step are carried out according to a blind or auto-recovery algorithm of the Constant Modulus or CMA type known per se, reducing the acquisition time of the system. The blind algorithm, being independent of the phase, allows the equalizer to remain stable even when the carrier is out of lock.

According to one embodiment, the convergence of the algorithm during the frequency estimation step is accelerated by increasing the number N of measurements.

According to one embodiment, the said equalization step carried out during the phase estimation step does not begin until after the estimation of the phase error relating to M points received, M being a predetermined integer.

According to one embodiment, when the convergence of the algorithm used for the phase estimation is achieved, the direct adaptive filter and the recursive adaptive filter are adapted by calculation of the error measured according to a decision feedback algorithm known per se.

BRIEF DESCRIPTION OF THE DRAWING

Other characteristics and advantages of the present invention will become apparent from the description of the embodiment which follows, taken by way of non-limiting example, with reference to FIG. 1 appended representing the schematic of an apparatus for receiving signals according to the invention.

DETAILED DESCRIPTION OF PREFERRED EMBODIMENTS

Figure 1:
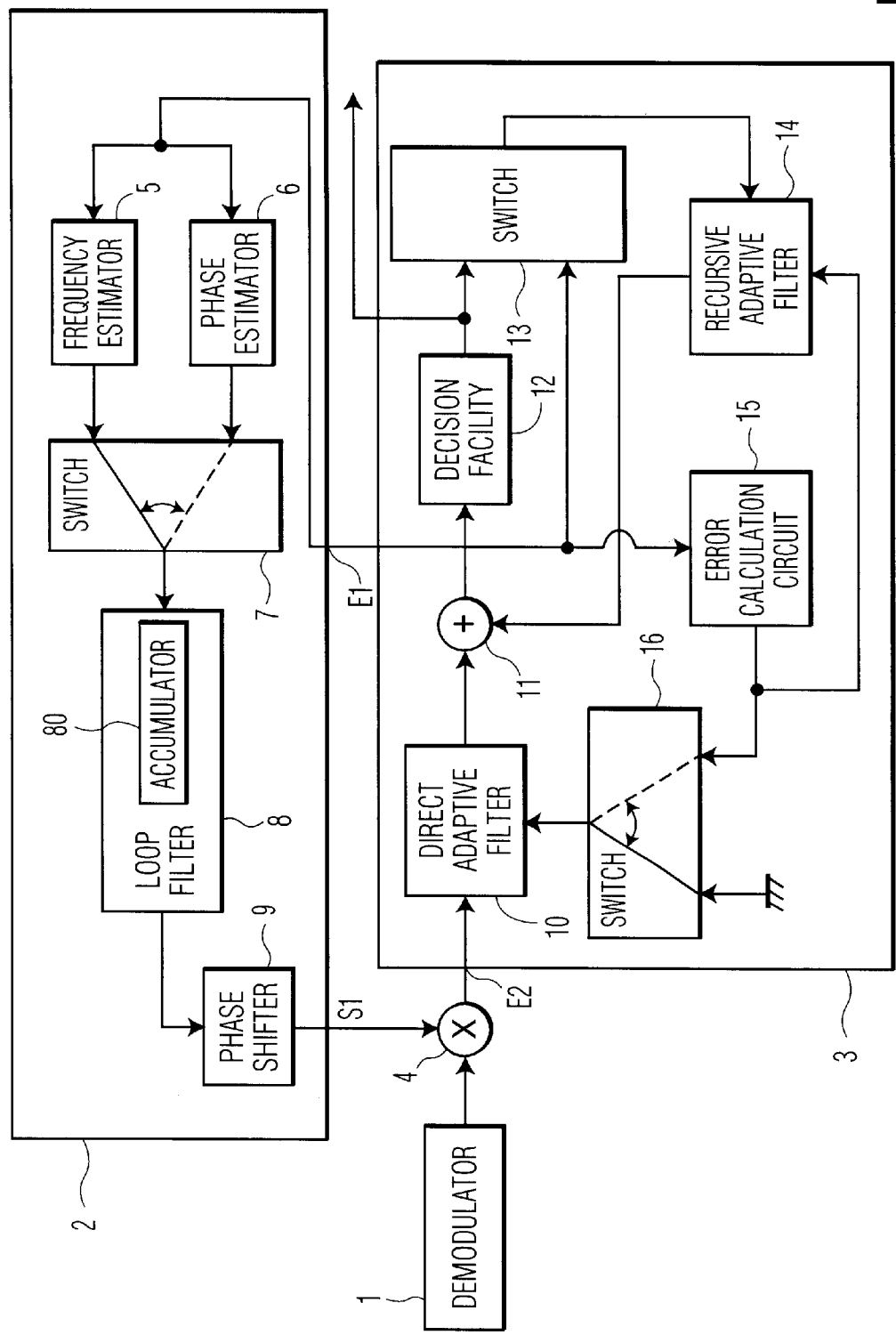

The apparatus according to the invention comprises a demodulator 1, a carrier recovery loop 2, an equalizer 3 and a mixer 4.

The carrier recovery loop 2 comprises a frequency estimator 5, a phase estimator 6, a switch 7, a loop filter 8 and a phase shifter 9.

The equalizer 3 comprises a direct adaptive filter 10, an adder 11, a decision facility 12, a first switch 13, a recursive adaptive filter 14, an error calculation circuit 15 and a second switch 16.

The input E1 of the carrier recovery loop is connected to the respective inputs of the frequency estimator 5 and the phase estimator 6. The output of the frequency estimator 5 and the output of the phase estimator 6 constitute two inputs of the switch 7 whose output is connected to the input of the loop filter 8. The output of the loop filter 8 is connected to the input of the phase shifter 9 whose output constitutes the output S1 of the carrier recovery loop 2.

The input E2 of the equalizer 3 is connected to the input of the direct adaptive filter 10 whose output is connected to a first terminal of the adder 11. The output of the adder 11 is connected to the input of the decision facility 12, one output of which is connected to a first input of the switch 13. The second input of the switch 13 is connected to the output of the adder 11. The output of the switch 13 is connected to the input of the recursive adaptive filter 14 whose output is connected to the second input of the adder 11. The output of the adder 11 is connected to the second input of the switch 13 as well as to the input of the error calculation circuit 15. The output of the error calculation circuit 15 is connected to a first input of the second switch 16 and to the control input of the recursive adaptive filter 14.

A second output of the decision facility 12 constitutes the output of the equalizer 3 and is connected, for example, to a decoder (not represented).

The output of the second switch 16 is connected to the control input of the direct adaptive filter 10.

The second input of the second switch 16 is connected, for example, to earth in such a way that, when the second switch 16 switches over to its second input, the control of the direct adaptive filter 10 is disabled.

The signal applied to the input E2 of the equalizer 3 is the signal emanating from the demodulator 1 phase-shifted by the quantity $\Delta\phi$, $\Delta\phi$ being the variable phase shift afforded by the phase shifter 9.

According to the invention, the carrier recovery device uses several successive modes.

In what follows, allusion will be made to the techniques of equalization, especially by adapting coefficients of direct or recursive filters. These techniques are known per se and are detailed in the work "Communication Systems" by Simon Haykin, Chapter 7.9 Adaptive equalization pages 452 to 461.

According to a first mode, the output of the switch 7 is connected to the output of the frequency estimator 5 and the output of the second switch 16 is connected to its second input connected to earth. According to this first mode, it follows that the carrier recovery loop 2 uses the frequency estimator 5 and the equalizer 3 adapts only the coefficients of the recursive adaptive filter 14. Now, the true problem in equalization is the initial convergence of the adaptation algorithm, which is generally measured by the duration in terms of symbol period which the variance of the error takes to stabilize at a minimum level which is ideally equal to 0. For example, in a point/multipoint network where a central transmitter transmits to a number of receivers, it is not practical to halt the transmission of data in order to transmit a learning sequence each time a receiver connects up to the network. The convergence of the equalizer must then take place in blind mode, that is to say without knowing the data transmitted. This is why, in the present case, the adaptation of the coefficients of the recursive adaptive filter 14 is performed preferentially in blind mode. According to the present embodiment, the technique used is of the CMA type which is known per se and described for example in patent U.S. Pat. No. 5,835,731. The convergence of the signal entering the equalizer then converges to a pre-established value. In the case of a digital transmission using a modulation scheme generating complex signals, the latter are regarded as vectors in the complex plane, with the real axis referred to as the in-phase channel (or "I" channel) and the imaginary axis referred to as the quadrature channel (or "Q" channel). Accordingly, when these signals are subject to channel distortions, interference between the I and Q channels occurs, requiring a complex adaptive equalizer. It is then a matter of making the power of the complex signal Is+jQs converge towards a pre-established value characteristic of the constellation, (Is, Qs) representing the coordinates of the signal in the complex plane and the constellation representing the collection of points (Is, Qs). Each quadrant of the constellation possesses a "corner" away from the origin of the complex plane. The segments connecting this origin to the corners form diagonals which will be used subsequently for the calculation of the phase errors.

In this mode, a rotation of the constellation is carried out.

The frequency estimator is set into operation as soon as the estimator input signal is "akin to a corner of a quadrant of the constellation" and as soon as the constellation is regarded as right, to within 90°. The expression "akin to a corner of a quadrant of the constellation" should be understood as meaning that the point received has sufficient power (the power of a point of the constellation is proportional to the distance separating this point from the origin of the complex plane) and that it is situated in proximity to a diagonal. Likewise, the expression "regarded as right" should be understood as meaning that locally the points present at the output of the equalizer are superimposed on the ideal points or patterns of the constellation. The measurement of the phase error between the signal received and the ideal corner of the constellation is performed by the frequency estimator 5 and transmitted to the loop filter 8. The phase errors with respect to the corners are calculated, for each component I and Q, on N consecutive samples, N being an integer number, for example, equal to 10.

The convergence of the algorithm is accelerated by adapting the value of N. Specifically, as and when the algorithm implemented converges towards the ideal value of the frequency, the rotation of the constellation decreases. The triggering of the frequency estimator is then less frequent, owing to the greater time required for the signal to undergo a residual rotation of 90°. It is then possible to increase the phase error acquisition window, that is to say to increase the parameter N.

As was mentioned previously, according to this first mode, the equalizer adapts only the coefficients of the recursive adaptive filter.

In a second mode of operation triggered after the stabilization of an accumulator 80 of the loop filter 8, the phase estimator 6 substitutes for the frequency estimator 5. It is then the output of the phase estimator 6 which is connected to the output of the switch 7. According to this second mode of operation, the equalizer 3 still adapts only the coefficients of the recursive adaptive filter 14. The estimation of the phase is enabled solely on the corners of the constellation. The estimation of the phase is performed on M points of the constellation, M being, for example, equal to 20.

This second mode of operation makes it possible to decrease the abrupt transitions when switching from the frequency estimator to the phase estimator and to avoid any false latching phenomena. Specifically, it may happen that the points received are rarely in the acquisition zones, in which case the frequency estimator will not often be updated. In this situation, the very relative stability of this estimator may lead one to think that convergence has been obtained and gives rise to a false latching.

Preferably, at the end of the second mode of operation, that is to say after the processing of the said M points, the phase of the carrier is finely tracked by permanently enabling the signal emanating from the phase estimator.

According to the results of the phase estimation, the carrier recovery process allows one or more return(s) from the second mode of operation to the first mode of operation.

A third mode of operation follows the second mode of operation. This third mode is different from the second mode in that the signal equalization phase in blind mode adapts the coefficients of the direct adaptive filter and also the coefficients of the recursive adaptive filter. The third mode of operation advantageously makes it possible to stabilize the rotation of the constellation at the input of the equalizer 3. This third mode of operation also makes it possible to concentrate the tasks due to the echoes at the output of the equalizer 3. The third mode of operation works on all the points P of the constellation, that is to say, for example, on 256 points.

When the size of the tasks is sufficiently reduced, a fourth mode of operation follows the third mode of operation. This fourth mode no longer uses the operation of the equalizer in blind mode but in decision feedback mode. It follows that the signal which leaves the switch 13 is the signal emanating from the decision facility 12 rather than the signal emanating from the adder 11.

The decision facility 12 makes it possible to define a meshing of the constellation. The complex plane defined by the quadrature components I and Q is then decomposed into P adjoining zones, each zone being defined around an ideal point of the constellation $I_i$, $Q_i$ (i=1, 2, . . . , P) by a discrepancy $\Delta I$ and a discrepancy $\Delta Q$. A zone $Z_i$ (i=1, 2, . . . , P) is therefore defined by a component I whose amplitude varies between $$I_i - \frac{\Delta I}{2} \text{ and } I_i + \frac{\Delta I}{2}$$

and by a component Q whose amplitude varies between $$Q_i - \frac{\Delta Q}{2} \text{ and } Q_i + \frac{\Delta Q}{2}$$

According to the fourth mode of operation, when the values of the quadrature signals I and Q enter a zone $Z_i$, the decision facility assigns the respective ideal values $I_i$ and $Q_i$ to these signals. The decision feedback mode makes it possible to eliminate the phase modulation completely.

What is claimed is:

1. Process for recovering a carrier of a received signal, said process comprising the steps of:

estimating the carrier frequency of the received signal;

estimating a phase of the received signal;

equalizing the received signal during the frequency estimation step by adapting the coefficients of a recursive adaptive filter; and continuing to adapt the coefficients of the recursive adaptive filter during the phase estimation step for a predetermined time.

2. Process according to claim 1, further comprising the step of adapting coefficients of a direct adaptive filter and the coefficients of the recursive adaptive filter after said step of equalizing.

3. Process according to claim 1, wherein said step of estimating the frequency is triggered when points input to the frequency estimator correspond to predetermined ideal points of a constellation representing a modulation scheme used, the ideal points being included among a pattern of the constellation and situated in an acquisition zone characterized by a considerable distance to an origin of the constellation and traversed by a diagonal connecting the origin of the constellation to the point which the acquisition zone surrounds.

4. Process according to claim 1, wherein said step of estimating the frequency includes measuring a phase difference corresponding to an angular distance between the point representing the signal received in the constellation and the diagonal.

5. Process according to claim 4, further comprising the step of updating of an accumulator delivering a carrier frequency error to a demodulator following said step of measuring the phase difference between N consecutive points received and the ideal points corresponding thereto during said step of estimating the frequency, N being an integer.

6. Process according to claim 2, characterized in that at least one of said step of equalizing during the frequency estimation step and said step of adapting the signal during the phase estimation step are carried out according to a blind or auto-recovery algorithm of the Constant Modulus or CMA type.

7. Process according to claim 6, further comprising the step of accelerating convergence of the algorithm during the frequency estimation step by increasing the number N of measurements.

8. Process according to claim 2, characterized in that said step of adapting during the phase estimation step begins after estimation of a phase error relating to M points received, M being a predetermined integer.

9. Process according to claim 6, wherein the direct adaptive filter and the recursive adaptive filter are adapted by calculation of an error measured according to a decision feedback algorithm upon achieving convergence of the algorithm used for phase estimation.

* * * * *